Sept. 1, 1931. J. F. LEVENTHAL 1,821,349
OPTICAL COMPENSATOR
Filed Sept. 3, 1927 4 Sheets-Sheet 1

Sept. 1, 1931.  J. F. LEVENTHAL  1,821,349
OPTICAL COMPENSATOR
Filed Sept. 3, 1927   4 Sheets-Sheet 2

Sept. 1, 1931.  J. F. LEVENTHAL  1,821,349
OPTICAL COMPENSATOR
Filed Sept. 3, 1927   4 Sheets-Sheet 3

Inventor
Jacob F. Leventhal
By his Attorneys
Kenyon & Kenyon

Sept. 1, 1931.   J. F. LEVENTHAL   1,821,349
OPTICAL COMPENSATOR
Filed Sept. 3, 1927    4 Sheets-Sheet 4

Inventor
Jacob F. Leventhal
By his Attorneys
Kenyon & Kenyon

Patented Sept. 1, 1931

1,821,349

UNITED STATES PATENT OFFICE

JACOB F. LEVENTHAL, OF NEW YORK, N. Y., ASSIGNOR TO THE FIRST NATIONAL BANK OF CHATTANOOGA, TRUSTEE, OF CHATTANOOGA, TENNESSEE

OPTICAL COMPENSATOR

Application filed September 3, 1927. Serial No. 217,485.

This invention relates to motion picture devices either for taking or projecting pictures and pertains more especially to that type of motion picture device in which the film is advanced continuously rather than intermittently. In such devices, a portion of the light path emanating from or proceeding toward the film must be progressively displaced as the film is advanced.

An object of this invention is a rotating optical compensator which displaces a light path emanating from or proceeding toward a continuously moving film in a direction optically parallel to the direction of movement of the film at substantially the same speed at which the film is advanced.

According to this invention a plurality of segmental plano-parallel refracting members are mounted upon a shaft at the same inclination thereto. Means are provided for supporting a film and advancing it in synchronism with the compensator so that it receives from or supplies to the compensator a moving light path and a lens is provided for receiving from or supplying to the compensator a stationary light path depending upon whether the compensator is used in connection with a projector or a camera. Rotation of the shaft brings each refracting member into the light path during not more than one-half of its period of rotation. Rotation of the refracting members causes variation in the angle of incidence which angle may be considered as having one component in the direction of optical movement of the film and its other component in the direction perpendicular thereto. Consequently the axis of the light path upon emerging from the refracting member moves curvilinearly. The curvilinear motion is the resultant of displacement of the axis of the light path in each of the two directions abovementioned. The first direction will hereafter be termed the direction of desired displacement and the second direction will be termed the direction of undesired displacement.

If the axis of the light path is parallel to the axis of rotation of the compensator, the displacement of the light path axis in the direction of desired displacement is proportional to the sine of the angle of rotation of the compensator with respect to the position of the refracting member at which the displacement in the said direction is zero. Such relationship is not desirable in connection with motion picture devices of the type in which the feed of the film is continuous. I have discovered that by properly inclining the axis of the light path with respect to the axis of rotation of the compensator, the displacement of the light path axis in the direction of desired displacement may be made substantially uniform per degree of rotation of the compensator over a limited range. This angle of inclination is not fixed but varies according to the inclination of the refracting member with respect to its axis of rotation. Thus, for example, if the refracting member is inclined 45° to the axis of rotation, the light path axis must be inclined to the axis of rotation at an angle of 27° 50'. Other combinations of angles will yield satisfactory results and the manner of obtaining these angles will be described in detail later.

An optical deflector is provided for directing the displaced light path to the same or another similar refracting member. The relationship of the deflector with respect to said refracting member is such that the angle of incidence of the displaced light path axis in the direction of desired displacement remains equal and is of the same sign while in the direction of undesired displacement it remains equal but is of opposite sign. The axis of the light path is again displaced in the directions of desired and undesired displacement. The second displacement in the direction of undesired displacement is of opposite sign to the original displacement in that direction, whereas the second displacement in the direction of the desired displacement is of the same sign as the original displacement in that direction. The original displacement in the direction of undesired displacement is thus counteracted while the original displacement in the direction of desired displacement is doubled. The ultimate displacement of the axis of the light path is only in the direction of desired displacement and at all times is substantially uniform per degree of rotation of the compensator. The remainder of the light path is of course displaced in the same manner as its axis.

The film is advanced proportionally to the rotation of the compensator preferably by means of a sprocket wheel mounted on the shaft of the compensator. The sprocket wheel is of proper size so that each rotation thereof advances the film the same number of picture areas as there are refracting members. The linear speed of the film is thus directly proportional to the angular speed of the compensator and the relationship of the film and the refracting members is such that a picture area and a refracting member move across the optical axis of the compensator in synchronism.

The above-described compensator is simple in structure, accurate in operation, and economical to manufacture. The motion of the light path is unidirectional and optically parallel to the motion of the film and compensates such motion. The optical elements are mounted upon a single shaft and are given a movement of pure rotation, thereby avoiding levers and gears which would introduce sufficient play into the compensator to be fatal to its optical accuracy. The sprocket wheel that moves the film is carried by the shaft upon which the refracting members are mounted so that movement of the film and the displacement of the light path axis are both directly proportional to angular movement of the refracting members.

The compensator may be arranged at either side of the objective lens, but preferably is mounted between the lens and the film. Such mounting is desirable because due to certain well-known qualities of ordinary lenses, it is practically impossible to maintain a constant relation between image size and object size when there is motion of either with respect to the optical axis. When the compensator is located between the lens and the film, there is no motion so far as the optical axis of the lens is concerned of either the object or the image, after optical compensation has occurred.

Other objects, novel features and advantages of the invention will be apparent from the following specification and accompanying drawings, wherein.

In order that the invention may be easily understood, the underlying principles will be explained with reference to the diagrammatic illustrations in Figs. 1 to 3, after which a practical physical embodiment of the invention incorporating these principles will be described. For the sake of simplicity, the invention will be disclosed as used in the projection of motion pictures although it is equally adapted for use in the taking of such pictures.

Figure 1:
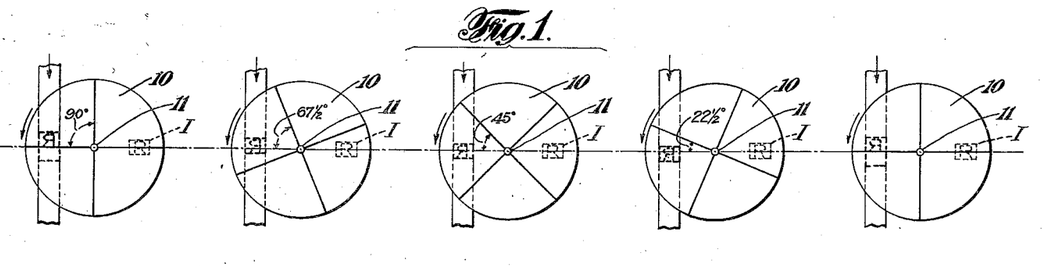
Figure 1 is a series of diagrammatic end views at different degrees of rotation of the refracting means in one embodiment of the invention.
Figure 2:
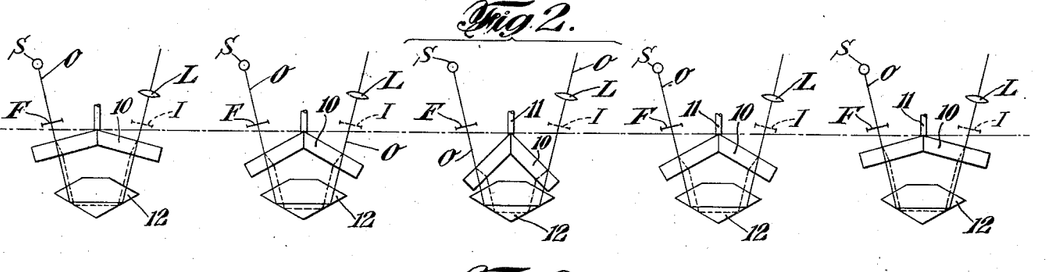
Figure 2 is a series of corresponding diagrammatic sections disclosing the counteracted displacement in one direction.
Figure 3:
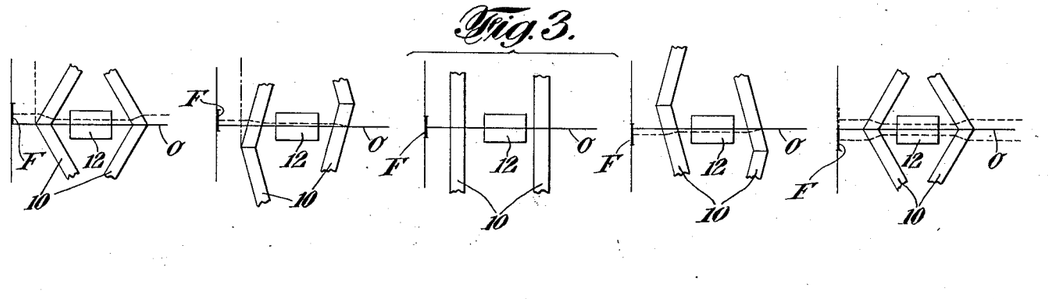
Figure 3 is a series of corresponding developed sections disclosing the doubled displacement in a direction at right angles to the direction in Fig. 2.

As diagrammatically disclosed in Figures 1, 2 and 3, a plurality of similar segmental plane-parallel refracting members 10 are symmetrically mounted upon a rotatable shaft 11 at the same inclination thereto. Although four refracting members are disclosed any even number of such members may be used. An optical deflector such as a reflecting prism 12 is provided to direct a light path from one refracting member to the refracting member opposite thereto and at the correct angle. L is the objective lens of the projector and O is its optical axis extended through the compensator. The optical axis lies in a plane passing through the axis of rotation of the compensator and bears such relation to said axis that substantially uniform displacement of a light path axis over a range of 90° is obtained. The light source S lies on the optical axis and the film F moves in a plane perpendicular thereto. I indicates the image of a picture area being projected. The light path to be displaced may be considered as emanating from a point on a picture area of the film and its axis moves in the direction of motion of the film in a plane inclined to the axis of rotation of the compensator. The film is advanced at a speed proportional to the rotation of the refracting members by mechanism not shown in the diagrammatic views so that it completes one revolution while the film is being advanced a distance equal to four picture areas. The movement of the film is so correlated with the rotation of the shaft 11 that a picture area and a refracting member 10 move synchronously across the optical axis O.

The position shown in Figures 1, 2 and 3 from left to right correspond to −45°, −22½°, 0° +22½° and +45° of rotation, zero being the position at which there is no displacement of the light ray axis in the direction of desired displacement.

Figure 1 discloses progressively the relative positions of a picture area and refracting member during one quarter revolution. At the start the lower edge of the picture area coincides with an edge of the refracting member and at the finish the upper edge of the picture area coincides with the opposite edge of the refracting member. At intermediate positions the linear movement of the film is proportional to the angular movement of the refracting member. Although the picture area is continually advanced the image I remains stationary due to the displacement of the light path axis.

In Figure 2 is disclosed the displacement effected by the refracting members in the direction of undesired displacement. The light path axis before displacement lies in a plane passing through the optical axis O and its displacement in the direction of undesired displacement is indicated by dotted lines parallel to the optical axis. After the axis of the light path has been displaced by one refracting member it is directed by the prism 12 to the diametrically opposite refracting member. Because of the fact that the second refracting member is symmetrical with respect to the first refracting member the angle of incidence of the light path axis in the direction of desired displacement remains equal and is of the same sign whereas in the direction of undesired displacement, while it remains equal, it is of opposite sign. As a result the displacement effected by the first refracting member is exactly counteracted by the displacement effected by the second refracting member insofar as the direction of undesired displacement is concerned.

In Fig. 3 is disclosed the displacement effected by the refracting members in the direction of desired displacement. In these figures which are developed views, the dotted lines indicate progressive positions assumed by the light path axis relative to the optical axis O in the direction of desired displacement while the film is being advanced one picture area. The displacement effected by the second refraction in the direction of desired displacement is added to the displacement in that direction effected by the first refraction due to the fact that in this direction the angle of incidence has remained equal and of the same sign. The refracting members are so designed that the maximum displacement effected by each equals one half the height of a picture area. As the displacement effected by the refracting members is substantially uniform per degree of rotation and as the displacement in the direction of undesired displacement has been counteracted, the axis of the light path after the second refraction coincides with the optical axis O at any position of the compensator. Although the film continually advances, the light path is so displaced that the image of the picture area remains stationary. As one picture area and refracting member move out of position the succeeding picture area and refracting member move into position. Two imperfect images are formed as indicated at position +45° in Figure 3 at the instant that the joining line of the refracting members crosses the optical axis but these images so quickly pass out as not to cause any seriously objectionable flicker on the screen. Preferably these images are prevented from reaching the screen by providing at one edge of each refracting member a strip of translucent material.

Figure 4:
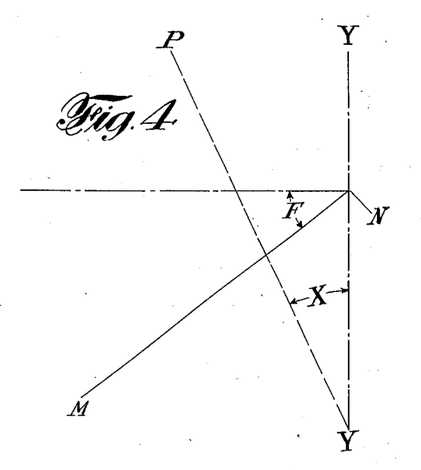
Figure 4 is a diagram disclosing the angles which are correlated to produce uniform displacement of the light path axis.
Figure 5:
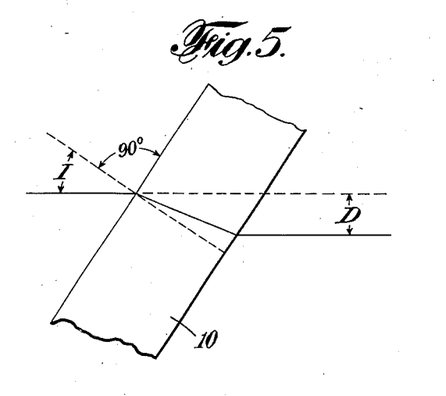
Figure 5 is a further explanatory diagram.

For proper operation of the compensator it is essential that the displacement of the axis of the light path be uniform per degree of rotation of the refracting members. This result is obtained by proper correlation of the inclination of the refracting members and the inclination of the axis of the light path with respect to the axis of rotation of the compensator. As shown in Figure 4, X is the angle between the axis PY of the light path and the axis of rotation YY. F is the fixed angle between a plane perpendicular to the axis of rotation and the face MN of a refracting member. In the computations which follow, I indicates the angle of incidence, R designates the angle of rotation of the refracting member, and D designates the displacement of the axis of the light path. Both the angle I and the displacement D (Figure 5) are measured in the direction of desired displacement, that is, the plane passing through the line PY perpendicular to the plane of the paper. The angles of incidence formed in the direction of undesired displacement are disregarded since the displacement in that direction is eventually nullified.

For a practical number of degrees of the angle of incidence, when the index of refraction is 1.55, D, in the case of plane-parallel refracting members is directly proportioned to tan I. Where the light path is parallel to the axis of rotation of the refracting members, $$\tan I = \tan F \times \sin R,$$

R being equal to zero when the refracting member is in the position shown in Figure 4. When the light path axis is inclined to the axis of rotation, $$\tan I = \tan F \times \sin R \times \frac{\sin A}{\sin (A+X)}$$

Where A is an angle such that $$\cos A = \cos R \times \tan F.$$

Since F is of constant value and D is proportional to tan I then D is proportional to $$\frac{\sin R \times \sin A}{\sin (A+X)}$$

As D must vary uniformly with R, the values of A and X are selected such that $$\frac{\sin R \times \sin A}{\sin (A+X)}$$

varies substantially directly with R. In a machine already constructed, the angle F has been made 45° and the value of X giving the best results was found to be 27° 50′. With these values of F and X, it is found that When R = 5°  A=45°  6′ 34″ and A+X=72° 56′ 34″
When R=15°  A=45° 59′ 34″ and A+X=73° 49′ 34″
When R=30°  A=49°  6′ 24″ and A+X=76° 56′ 24″
When R=45°  A=54° 44′  8″ and A+X=82° 34′  8″

From this it follows that

When R= 5° $\frac{\sin A}{\sin (A+X)}$ =.74106 and $\frac{\sin R \times \sin A}{\sin (A+X)}$ =.06459

When R=15° $\frac{\sin A}{\sin (A+X)}$ =.74890 and $\frac{\sin R \times \sin A}{\sin (A+X)}$ =.19383

When R=30° $\frac{\sin A}{\sin (A+X)}$ =.77600 and $\frac{\sin R \times \sin A}{\sin (A+X)}$ =.38800

When R=45° $\frac{\sin A}{\sin (A+X)}$ =.82340 and $\frac{\sin R \times \sin A}{\sin (A+X)}$ =.58223

Thus it is evident that D which as above pointed out is proportional to $$\frac{\sin R \times \sin A}{\sin (A+X)}$$

varies substantially uniformly per degree of rotation over a range of 45° either side of a zero point or over a total range of 90°. As the greatest desired displacement in present film of various sizes is never greater than .375″, that is, one-half the height of a picture area, the actual errors are smaller than indicated in the above tabulation. Although the tabulated figures are not exactly proportional, it is evident that the percentage error is so small as to be negligible in actual practice. With refracting members designed to effect a maximum displacement of .375″ at 45°, the displacement at intermediate points so nearly coincides with the theoretically perfect displacement that the deviation therefrom is not detectable to the human eye and the picture on the screen is stationary.

The values of F and X are not fixed but may be varied with respect to each other without substantially altering the effectiveness of the compensator. Below are listed certain values of F and X which have been found to satisfy the requirements.

F=10°      X=71°
F=15°      X=63°
F=20°      X=55°
F=25°      X=48°
F=30°      X=42°
F=35°      X=36° 30′
F=40°      X=30° 30′
F=45°      X=27° 50′

There is no definite rule for obtaining the relationship necessary between the angles F and X. It is necessary first to select arbitrarily one of the angles and then to find the other angle by trial and error. The second angle is found by solving the functions for different angles until one is found which satisfies the requirements.

Figure 6:
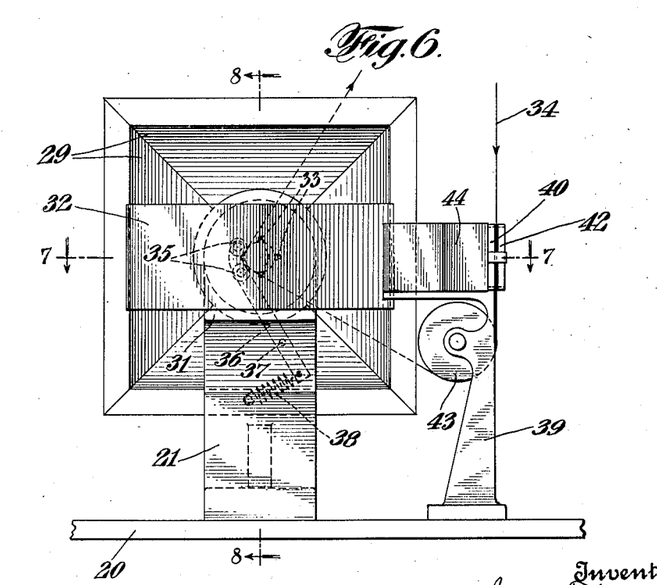
Figure 6 is an elevation of a practical embodiment of the invention.
Figure 7:
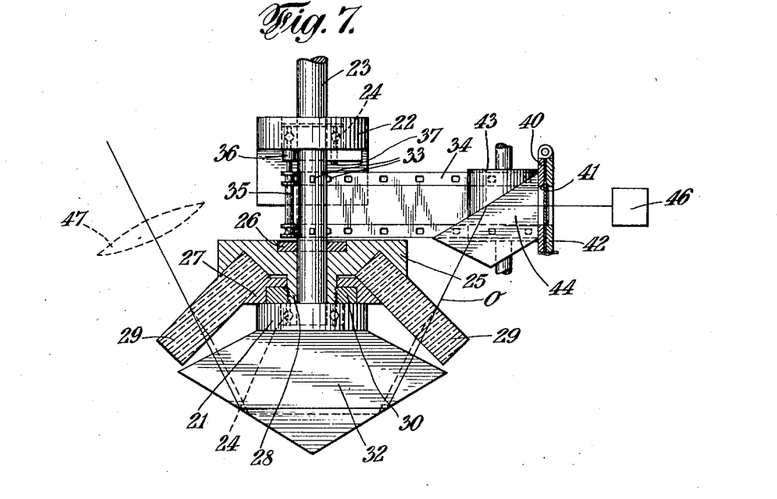
Figure 7 is a section on the line 7—7 of Figure 6.
Figure 8:
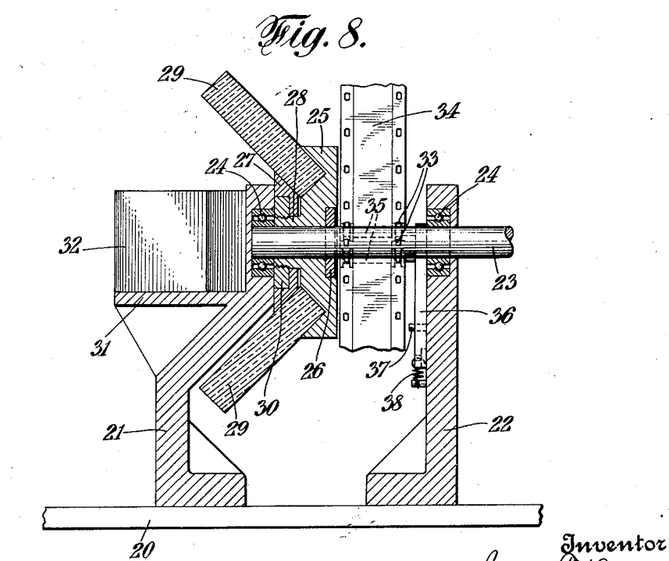
Figure 8 is a section on the line 8—8 of Figure 6.

Figures 6, 7 and 8 disclose a practical embodiment of the invention suitable for use in connection with a motion picture projector. 20 indicates the base plate of the machine which is provided with supporting members 21 and 22 in which is rotatably mounted a shaft 23 by means of ball bearings 24. A carrier 25 is mounted upon the shaft 23 and is located thereon by means of a collar 26 on the shaft and seated in a recess provided for the purpose in the carrier 25. A plurality of recesses are provided in the carrier and form with the follower 27 which is mounted on the hub 28 of the carrier, sockets to receive the refracting members 29. A collar 30 threaded on the hub 28 provides means for moving the follower 27 into clamping position with respect to the refracting members 29. The support 21 is provided with a shelf 31 upon which is supported a double reflecting prism 32. The shaft 23 is driven from a suitable source of power such as a motor or the like, not shown.

Upon the shaft 23 between the support 22 and the carrier 25 are provided teeth 33 to engage holes formed in the film 34 adjacent its edges. The film is held against the shaft by means of contact rollers 35 mounted upon an arm 36 pivoted to the support 22 at 37. A spring 38 normally holds the contact rollers in engagement with the film. A support 39 extends from the base plate 20 and carries at its end a film guide 40. In the film guide is provided an aperture 41 which is of a length equal to the height of two picture areas. A correspondingly apertured gate 42 is provided for holding the film in the guide. This gate presses against only the edges of the film to maintain the latter under tension. An idler roller 43 is mounted on the support 39 and the film is passed around it to the shaft 23 from which it leads to a suitable take up reel. The number of teeth 33 on the shaft 23 is such that upon each complete revolution of the shaft the film is advanced four complete picture areas. A reflecting prism 44 mounted on the support 39 is arranged to receive a light beam passing through the film from the light source 46 of a projector and deflect it to the refracting members at the proper inclination with respect to the axis of rotation. The displaced light path is received by the objective lens 47 of the projector.

The operation of the device is as follows: The film which is to be projected is drawn through the guide and around the idler roller and is engaged with the sprocket teeth. The film is so arranged that when the refracting members are in the position shown the center of a picture area coincides with the optical axis O. Rotation of the shaft 23 causes the film to advance four pictures for each rotation of the shaft and at the same time the refracting members are brought into position to displace the moving light path emanating from the corresponding picture area. The displaced light path is received by the objective lens and projected to the screen. Although the film is continuously moving, the image presented to the objective lens remains stationary. The equivalent of two full picture areas is illuminated at all times. The relationship of the refracting members to the paths of light emanating from successive picture areas is such that the successive pictures blend into one another without seriously objectionable flicker or blur. The axis of each light path is twice displaced in the manner described in connection with Figures 1 to 3 and the displacement effected by the second refracting member counteracts in one direction and doubles in another direction the displacement effected by the first refracting member so that the ultimate displacement is unidirectional and optically parallel to the direction of movement of the film. The angle of inclination of the refracting members to the axis of rotation is so correlated to the angle between the axis of rotation and the light path axis that the ultimate displacement per degree of rotation is substantially uniform. The thickness of the refracting members and the refractive index is such that the ultimate displacement is equal to the height of one picture. As a result, the picture being projected when presented to the objective lens is at rest with respect to the optical axis and may be projected upon a screen in the usual manner.

Figure 9:
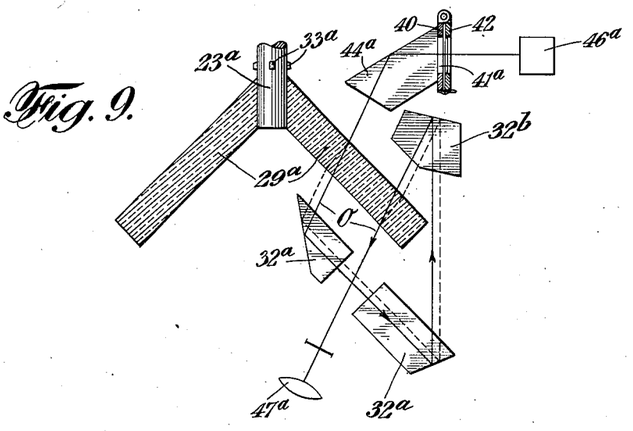
Figure 9 is a sectional view of a modified form of the invention.

Figure 9 discloses a section corresponding generally to that disclosed in Figure 7 of a modified form of the invention. In this figure, 23a is the axis upon which are mounted a plurality of refracting members 29a which may be either odd or even in number. On the shaft 23a are provided teeth 33a for imparting linear motion to the film which passes through the guide 41a as described in connection with Figures 6, 7 and 8. 46a is the source of light and 44a is the prism for directing the light path emanating from the film to the refracting member 29a at the proper inclination. 47a is the objective lens. A compound reflecting prism 32a deflects the light path around the edge of the members 29a to a reflector 32b which directs the light path to the refracting member 29a a second time. O designates the optical axis of the system and the arrangement of the prisms is such that the optical axis is deflected three times and the two sections of the optical axis passing through the refracting member 29a are parallel. In this modification, as in the modification disclosed in Figures 6, 7, and 8, the axis of the displaced light path is presented to the refracting member with its angle of incidence in the direction of desired displacement equal to and of the same sign as formerly but in the direction of undesired displacement with said angle equal but of opposite sign. The displacement effected by the first refraction is exactly counteracted by the displacement effected by the second refraction in the direction of undesired displacement and is doubled in the direction of desired displacement.

Figure 10:
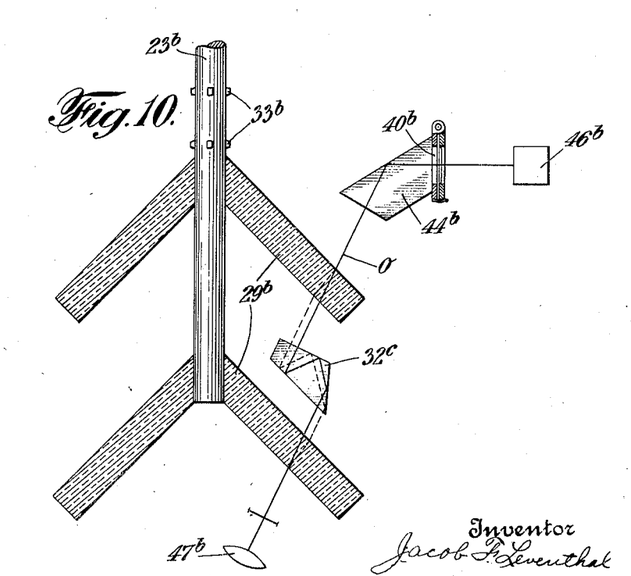
Figure 10 is a sectional view of a further modification.

Figure 10 is a section similar to Figure 9 of a still further modification. In this modification, 23b designates the shaft upon which are mounted two sets of refracting members 29b. Either an even or odd number of refracting members may be used. Teeth 33b are provided on the shaft for effecting linear movement of the film through the guide 40b. 46b is the light source and 47b is the objective lens. 44b is the prism for deflecting the light path at the proper inclination to the refracting members. 32c is a reflecting prism for reflecting three times the axis of a path of light. O is the optical axis of the system. With this modification as in that disclosed in Figure 9, the three reflections are effective to reverse the displacement in the direction of undesired displacement so that the displaced light path is presented for the second refraction with its angle of incidence in the direction of desired displacement equal to and of the same sign as formerly but in the direction of undesired displacement although equal to opposite sign. As a result the displacement effected by the second refraction nullifies in the direction of undesired displacement, the displacement effected by the first refraction and in the direction of desired displacement, doubles the displacement effected by the first refraction.

In each modification the axis of the light path is displaced in a direction optically parallel but opposite to the direction of movement of the film, an amount equal to the extent of movement of the film. The motion of the film is thus compensated and the image produced is a stationary one although the film is advancing at a uniform rate.

Although the refracting members have been disclosed as solid plates, it is within the contemplation of this invention to utilize any type of refracting unit having plane-parallel bounding surfaces. If desired, the axis of the light path presented to the film for projection purposes may be caused to move in the direction of motion of the film. It is of course understood that the introduction of an image forming lens between the refracting members would be productive of certain advantages and might be advisable. However, it would not in any way constitute a departure from the essential features of the invention. Obviously such a machine as this can be used in the production of naturally colored pictures by means of the well known additive process by transparently coloring the plates of the rotating wheel. For example, for a two color process, using a four plate machine, one of the plates would be colored red, the next green, the next red and the last green. The same principle may be carried still further into the three color work.

Obviously, the apparatus above described may be equipped with a different number of plates than shown in the embodiment disclosed. However, in any instance, the angular relationship of the light beam and rotation axes to the plates will be such that the displacement of the light beam axis will be substantially proportional to the degree of rotation of the plates over a sufficient range to achieve the desired result. The preferred embodiment disclosed in the drawings is provided with four plates, thus requiring that the range above referred to be approximately 90°. With a greater number of plates, the required range will be correspondingly smaller and with a smaller number of plates the required range will be correspondingly greater. Irrespective of the number of plates used the above described condition of proportionality will extend over a substantial range of rotation. Moreover, various structural changes may be made without in any way departing from the spirit of the invention as defined in the appended claims.

What I claim as new and desire to secure by Letters Patent of the United States is:

1. In an optical apparatus, optical plane-parallel refracting means, means to rotate said refracting means about an axis inclined thereto to effect varying displacement of a light beam axis in each of two directions perpendicular to each other, means for directing a beam of light with its axis inclined to the axis of rotation of said refracting means, the angle between the axis of rotation and the light beam axis being so correlated with the angle between the axis of rotation and the refracting means that the displacement in one direction effected by said refracting means, when rotated, is substantially proportional to the degree of rotation of the refracting means over a substantial range.

2. An optical apparatus comprising plane-parallel refracting means, means to rotate said refracting means about an inclined axis to effect varying displacement of a light beam axis in each of two directions perpendicular to each other, and optical means for transmitting a light beam after displacement by one portion of said refracting means to another portion of said refracting means for additional displacement in one of said directions and reverse displacement in the other of said directions.

3. An optical apparatus comprising a plurality of plane-parallel refracting members correspondingly inclined to a common axis, means to rotate said members to effect varying displacement of a light beam axis in each of two directions perpendicular to each other, and optical means for transmitting a light beam displaced by one of said refracting members to one of said refracting members for additional displacement in one of said directions and reverse displacement in the other of said directions.

4. An optical apparatus comprising an even number of plane-parallel refracting members symmetrically arranged with respect to an axis inclined at the same angle to each of said members, means for rotating said refracting members to effect varying displacement of a light beam axis in each of two directions perpendicular to each other, an optical means for transmitting a light beam after displacement by one of said members to the member opposite thereto for additional displacement in one of said directions and reverse displacement in the other of said directions.

5. An optical apparatus comprising plane-parallel refracting means rotatable about an axis inclined thereto, means to rotate said refracting means to effect varying displacement of a light beam axis in each of two directions perpendicular to each other, and optical reversing means for transmitting to the refracting means for further displacement a light beam already once displaced thereby.

6. An optical apparatus comprising a pair of plane-parallel refracting members, means to rotate said members about an inclined axis to effect varying displacement of a light beam axis in each of two directions perpendicular to each other, and optical means intermediate said refracting members for transmitting a beam of light displaced by one of said members to the other at reverse angularity in one of said directions.

7. An optical apparatus comprising an even number of plane-parallel refracting members symmetrically arranged with respect to an axis inclined at the same angle to each of said members, means for rotating said refracting members to effect varying displacement of a light beam axis in each of two directions perpendicular to each other, and optical deflecting and reversing means for transmitting a light beam displaced by one of said members to the opposite member for further displacement.

8. An apparatus of the character described comprising plane-parallel refracting means, means to rotate said refracting means about an inclined axis to effect varying displacement of a light beam axis in each of two directions perpendicular to each other, means for projecting a light beam to said refracting means, means to effect linear movement of a film across said light beam in synchronism with the angular movement of the refracting means, and optical means for transmitting a light beam after displacement by one portion of said refracting means to another portion of said refracting means for additional displacement in one of said directions and reverse displacement in the other of said directions.

9. An apparatus of the character described comprising an even number of plane-parallel refracting members symmetrically arranged with respect to an axis inclined at the same angle to each of said members, means for rotating said refracting members to effect varying displacement of a light beam axis in two directions perpendicular to each other, means for projecting a light beam to said refracting members, means to effect linear movement of a film across said light beam in synchronism with the angular movement of the refracting members, and optical means for transmitting a light beam from one of said refracting members to the member opposite thereto at reverse angularity in one of said directions.

10. An apparatus of the character described comprising an even number of plane-parallel refracting members symmetrically arranged with respect to an axis inclined at the same angle to each of said members, means for rotating said refracting members to effect varying displacement of a light beam axis in two directions perpendicular to each other, means for projecting a light beam to said refracting members, means including a sprocket rotatable in timed relation with said refracting members to effect linear movement of a film across said light beam in synchronism with the angular movement of the refracting members, and optical deflecting and reversing means for transmitting a light beam from one of said refracting members to the opposite refracting member.

11. In an optical apparatus, plane-parallel refracting means, means to rotate said refracting means about an axis inclined thereto, optical means for directing a light beam twice through said refracting means at an angle to the axis of rotation to produce additive displacements of a light beam axis in one direction and counter-active displacements in a second direction perpendicular to said first direction, and means to effect linear movement of a film across said light beam in synchronism with the rotational movement of said refracting means.

12. In an optical apparatus, a plane-parallel refracting member rotatable about an axis inclined thereto, a second plane-parallel refracting member rotatable about an axis inclined thereto, means for synchronously rotating said refracting members, optical means for directing a light beam successively through said refracting members to produce additive displacements of the light beam axis in one direction and counter-active displacements in a second direction perpendicular to said first direction, and means for effecting linear movement of a film across said light beam in synchronism with the rotational movement of said refracting members.

13. An optical apparatus of the character described comprising plane-parallel refracting means, means to rotate said refracting means about an inclined axis to effect varying displacement of a light beam axis in each of two directions perpendicular to each other, means for directing a beam of light with its axis inclined to the axis of rotation of said refracting means, the angle between the axis of rotation and the light beam axis being so correlated with the angle between the axis of rotation and the refracting means that the displacement effected by said refracting means, when rotated, is substantially uniform in one direction per degree of rotation over a limited range, and optical means for transmitting a light beam after displacement by one portion of said refracting means to another portion of said refracting means for additional displacement in said one direction, and reverse displacement in the other direction.

14. An optical apparatus of the character described comprising plane-parallel refracting means, means to rotate said refracting means about an inclined axis to effect varying displacement of a light beam axis in each of two directions perpendicular to each other, means for directing a beam of light with its axis inclined to the axis of rotation of said refracting means, the angle between the axis of rotation and the light beam axis being so correlated with the angle between the axis of rotation and the refracting means that the displacement effected by said refracting means, when rotated, is substantially uniform in one direction per degree of rotation over a limited range, and optical deflecting means for transmitting a light beam displaced by one portion of said refracting means to another portion thereof for further displacement, said deflector being effective to deflect the light beam axis at least twice intermediate the first and second displacement thereof.

15. An optical apparatus comprising a plurality of plane-parallel refracting members, means to rotate said members about an inclined axis to effect varying displacement of a light beam axis in each of two directions perpendicular to each other, optical means for transmitting a light beam displaced by one of said refracting members to another refracting member at reverse angularity in one of said directions, and means for directing a beam of light to said members with its axis inclined to the axis of rotation of said members, the angle between the axis of rotation and the light beam axis being so correlated with the angle between the axis of rotation and the refracting members that the displacement effected by said refracting members, when rotated, is substantially uniform in one direction per degree of rotation over a limited range.

16. An optical apparatus comprising an even number of plane-parallel refracting members segmentally arranged with respect to an axis inclined at the same angle to each of said members, means for rotating said refracting members to effect varying displacement of a light beam axis in each of two directions perpendicular to each other, optical means for transmitting a light beam after displacement by one of said members to the member opposite thereto at reverse angularity in one of said directions, and means for directing a beam of light to said members with its axis inclined to the axis of rotation of said members, the angle between the axis of rotation and the light beam axis being so correlated with the angle between the axis of rotation and the refracting members that the displacement effected by said refracting members, when rotated, is substantially uniform in one direction per degree of rotation over a limited range.

17. An optical apparatus comprising plane-parallel refracting means rotatable about an axis inclined thereto, means to rotate said refracting means to effect varying displacement of a light beam axis in each of two directions perpendicular to each other, optical deflecting and reversing means for projecting to said refracting means for further displacement a light beam already once displaced by said refracting means, and means for directing a beam of light to said means with its axis inclined to the axis of rotation of said means, the angle between the axis of rotation and the light beam axis being so correlated with the angle between the axis of rotation and the refracting means that the displacement effected by said refracting means, when rotated, is substantially uniform in one direction per degree of rotation over a limited range.

18. An optical apparatus of the character described comprising a plurality of segmental rotatable plane-parallel refracting members symmetrically arranged with respect to an axis inclined at the same angle to each of said members, means for rotating said refracting members to effect varying displacement of a light beam axis in each of two directions perpendicular to each other, optical deflecting means for directing a light beam from one refracting member to the refracting member opposite thereto, and means for directing a light beam at an inclination to the axis of rotation, the angle between the axis of rotation and the light beam axis being so correlated with the angle between the axis of rotation and the refracting members that the displacement effected by said refracting members, when rotated, is substantially uniform in one direction per degree of rotation over a limited range.

19. An optical apparatus comprising a pair of plane-parallel refracting members rotatable to effect varying displacement of a light beam axis in each of two directions perpendicular to each other, the displacement effected by the second plate being additional in one of said directions and reverse in the other of said directions to that effected by the first member, means to rotate said members, and means for directing a beam of light successively through said members with its axis inclined to the rotational axis, the angle between the rotational axis and the light beam axis being so correlated with the angle between the rotational axis and the refracting members that the displacement in said first direction effected by each refracting member, when rotated, is substantially uniform per degree of rotation.

20. In an optical apparatus, plane-parallel refracting means, means to rotate said refracting means about an axis inclined thereto, and optical means for directing a light beam twice through said refracting means at an angle to the axis of rotation to produce additive displacements of a light beam axis in one direction and counter-active displacements in a second direction perpendicular to said first direction, the angular relationship of the rotational and light beam axes to the refracting means being such that the displacement of the light beam axis in said first direction is substantially proportional to the degree of rotation of said refracting means.

21. In an optical apparatus, a plane-parallel refracting member rotatable about an axis inclined thereto, a second plane-parallel refracting member rotatable about an axis inclined thereto, means for synchronously rotating said refracting members, optical means for directing a light beam successively through said refracting members to produce additive displacements of the light beam axis in one direction and counter-active displacements in a second direction perpendicular to said first direction, the angular relationship of the rotational and light beam axes to the refracting means being such that the displacement of the light beam axis in said first direction is substantially proportional to the degree of rotation of said members.

22. An optical apparatus of the character described comprising plane-parallel refracting means, means to rotate said refracting means about an inclined axis to effect varying displacement of a light beam axis in each of two directions perpendicular to each other, means for directing a beam of light with its axis inclined to the axis of rotation of said refracting means, the angle between the axis of rotation and the light beam axis being so correlated with the angle between the axis of rotation and the refracting means that the displacement effected by said refracting means, when rotated, is substantially uniform in one direction per degree of rotation over a limited range, optical means for transmitting a light beam after displacement by one portion of said refracting means to another portion of said refracting means for additional displacement in said one direction and reverse displacement in the other direction, and means to effect linear movement of a film across said light beam in synchronism with the angular movement of said refracting means.

23. An optical apparatus of the character described comprising a plurality of segmental plane-parallel refracting members rotatable about an axis inclined thereto, means to rotate said refracting members to effect varying displacement of a light beam axis in each of two directions perpendicular to each other, means for directing a light beam at an angle to the axis of rotation, means for rotating said refracting members, means to effect linear movement of a film across said light beam in synchronism with the angular movement of said refracting members, and optical means for transmitting a light beam after displacement by one of said members to another thereof at reversed angularity in one of said directions, the angle between the axis of rotation and the light beam axis being so correlated with the angle between the axis of rotation and the refracting members that displacement effected by said refracting members, when rotated, is substantially uniform in one direction per degree of rotation over a limited range.

24. An optical apparatus comprising a plurality of plane-parallel refracting members, means to rotate said members about an inclined axis to effect varying displacement of a light beam axis in each of two directions perpendicular to each other, optical means for transmitting a light beam displaced by one of said refracting members to another refracting member at reverse angularity in one of said directions, and means for directing a beam of light to said members with its axis inclined to the axis of rotation of said members, the angle between the axis of rotation and the light beam axis being so correlated with the angle between the axis of rotation and the refracting members that the displacement effected by said refracting members, when rotated, is substantially uniform in one direction per degree of rotation over a limited range, and means to effect linear movement of a film across said light beam in synchronism with the angular movement of said refracting means.

25. An optical apparatus comprising a plurality of plane-parallel refracting members, means to rotate said refracting members about an inclined axis to effect varying displacement of a light beam axis in each of two directions perpendicular to each other, optical means for transmitting a light beam displaced by one of said refracting members to one of said refracting members at reverse angularity in one of said directions, means for directing a beam of light with its axis inclined to the axis of rotation of said refracting means, the angle between the axis of rotation and the light beam axis being so correlated with the angle between the axis of rotation and the refracting members that the displacement effected by said refracting members, when rotated, is substantially uniform in one direction per degree of rotation over a limited range, and means to effect linear movement of a film across said light beam in synchronism with the angular movement of said refracting members.

26. An optical apparatus comprising an even number of plane-parallel refracting members symmetrically arranged with respect to an axis inclined at the same angle to each of said members, means for rotating said refracting members to effect varying displacement of a light beam axis in each of two directions perpendicular to each other, optical means for transmitting a light beam after displacement by one of said members to the member opposite thereto at reverse angularity in one of said directions, means for directing a beam of light to said members with its axis inclined to the axis of rotation of said members, the angle between the axis of rotation and the light beam axis being so correlated with the angle between the axis of rotation and refracting members that the displacement effected by said refracting members, when rotated, is substantially uniform in one direction per degree of rotation over a limited range, and means to effect linear movement of a film across said light beam in synchronism with the angular movement of said refracting members.

27. An optical apparatus comprising plane-parallel refracting means rotatable about an axis inclined thereto, means to rotate said refracting means to effect varying displacement of a light beam axis in each of two directions perpendicular to each other, optical deflecting and reversing means for projecting for additional displacement by said refracting means a light beam already displaced by said refracting means, and means for directing a beam of light to said refracting means with its axis inclined to the axis of rotation of said means, the angle between the axis of rotation and the light beam axis being so correlated with the angle between the axis of rotation and the refracting means that the displacement effected by said refracting means, when rotated, is substantially uniform in one direction per degree of rotation over a limited range, and means to effect linear movement of a film across said light beam in synchronism with the angular movement of said refracting members.

28. An optical apparatus of the character described comprising a pair of plane-parallel refracting members, means to rotate said members about an inclined axis to effect varying displacement of a light beam axis in each of two directions perpendicular to each other, optical deflecting and reversing means for transmitting a beam of light displaced by one of said members to the other member, means for directing a beam of light to said members with its axis inclined to the axis of rotation of said members, the angle between the axis of rotation and the light beam axis being so correlated with the angle between the axis of rotation and the refracting members that the displacement effected by said refracting members, when rotated, is substantially uniform in one direction per degree of rotation over a limited range, and means to effect linear movement of a film across said light beam in synchronism with the angular movement of said refracting members.

29. An optical apparatus comprising a pair of plane-parallel refracting members rotatable to effect varying displacement in a light beam axis in each of two directions perpendicular to each other, the displacement effected by the second plate being additional in one of said directions and reverse in the other of said directions to that effected by the first member, means to rotate said members, means for directing a beam of light successively through said members with its axis inclined to the rotational axis, the angle between the rotational axis and the light beam axis being so correlated with the angle between the rotational axis and the refracting members that the displacement in said first direction effected by each refracting members, when rotated is substantially uniform per degree of rotation, and means to effect linear movement of a film across said light beam in synchronism with the angular movement of said refracting means.

30. In an optical appartus, plane-parallel refracting means, means to rotate said refracting means about an axis inclined thereto, optical means for directing a light beam twice through said refracting means at an angle to the axis of rotation to produce additive displacements of a light beam axis in one direction and counter-active displacements in a second direction perpendicular to said first direction, the angular relationship of the rotational and light beam axes to the refracting means being such that the displacement of the light beam axis in said first direction is substantially proportional to the degree of rotation of said refracting means, and means to effect linear movement of a film across said light beam in synchronism with the rotational movement of said refracting means.

31. In an optical apparatus, a plane-parallel refracting member rotatable about an axis inclined thereto, a second plane-parallel refracting member rotatable about an axis inclined thereto, means for synchronously rotating said refracting members, optical means for directing a light beam successively through said refracting members to produce additive displacements of the light beam axis in one direction and counter-active displacements in a second direction perpendicular to said first direction, the angular relationship of the rotational and light beam axes to the refracting means being such that the displacement of the light beam axis in said first direction is substantially proportional to the degree of rotation of said members, and means to effect linear movement of a film across said light beam in synchronism with the rotational movement of said refracting members.

32. An optical apparatus comprising a pair of plane-parallel refracting members rotatable about an axis inclined thereto, said refracting members being axially spaced and equally inclined, means for rotating said refracting members to effect displacement of a light beam axis in each of two directions perpendicular to each other, and optical means for transmitting a beam of light after displacement by one of said refracting members to the other of said refracting members for additive displacement in one of said directions and counteractive displacement in the other of said directions.

33. An optical apparatus comprising a pair of rotatable plane-parallel refracting members, said members being equally inclined to the axis of rotation and being axially spaced, means for rotating said refracting members, and optical means for projecting a ray of light displaced by one of said refracting members to the other of said refracting members at reversed angularity in one direction.

34. An optical apparatus comprising a shaft, a pair of plane-parallel refracting members mounted on said shaft at equal inclination thereto and in axially spaced relation, and optical reversing means interposed between said refracting members.

35. An optical apparatus comprising a rotatable plane-parallel refracting member inclined to its axis of rotation, a second rotatable plane-parallel refracting member inclined to its axis of rotation, said members being axially spaced and equally inclined, means simultaneously to rotate said refracting members to effect displacement of a light beam axis in each of two directions perpendicular to each other, and optical means for transmitting a beam of light after displacement by one of said members to the other of said members for additive displacement in one of said directions and counteractive displacement in the other of said directions.

36. An optical apparatus comprising axially spaced plane-parallel refracting members rotatable about an axis inclined thereto, and optical reversing means interposed between said refracting members.

37. An optical apparatus comprising axially spaced plane-parallel refracting members rotatable about an axis inclined thereto, optical reversing means interposed between said refracting members, means for directing a light beam through said refracting members at an angle to the axis thereto, and means to rotate said refracting members in unison to produce varying additive displacements of the light beam axis in one direction and varying counteractive displacements in a direction perpendicular to said first direction, the angular relationship of the rotational and light beam axes to the refracting means being such that the displacement of the light beam axis in said first direction is substantially proportional to the degree of rotation of said refracting means.

38. An optical apparatus comprising axially spaced plane-parallel refracting members rotatable about an axis inclined thereto, optical reversing means interposed between said refracting members, means for directing a light beam successively through said refracting members, means to rotate said refracting members, and means to effect linear movement of a film across said light beam in synchronism with the angular movement of the refracting members.

39. An optical apparatus comprising axially spaced plane-parallel refracting members rotatable about an axis inclined thereto, optical reversing means interposed between said refracting members, means for directing a light beam through said refracting members at an angle to the axis thereof, means to rotate said refracting members in unison to produce varying additive displacements of the light beam axis in one direction and varying counteractive displacements in a direction perpendicular to said first direction, the angular relationship of the rotational and light beam axes to the refracting means being such that the displacement of the light beam axis in said first direction is substantially proportional to the degree of rotation of said refracting means, and means to effect linear movement of a film across said light beam in synchronism with the angular movement of the refracting members.

In testimony whereof, I have signed my name to this specification.

JACOB F. LEVENTHAL.

Certificate of Correction

Patent No. 1,821,349. Granted September 1, 1931, to

JACOB F. LEVENTHAL

It is hereby certified that error appears in the printed specification of the above-numbered patent requiring correction as follows: Page 3, line 130, strike out the equation and insert instead $cot\ A = cos\ R \times tan\ F$; and that the said Letters Patent should be read with this correction therein that the same may conform to the record of the case in the Patent Office.

Signed and sealed this 20th day of October, A. D. 1931

[SEAL.]

M. J. MOORE,
*Acting Commissioner of Patents.*